United States Patent [19]

DuJour

[11] Patent Number: 4,744,282
[45] Date of Patent: May 17, 1988

[54] MUSIC BOX WITH INSTRUCTIONAL DATA TABLES

[76] Inventor: Nadal DuJour, 570 NW. 190 St., Miami, Fla. 33169

[21] Appl. No.: 96,086

[22] Filed: Sep. 14, 1987

[51] Int. Cl.$^4$ .............................................. G10F 1/06
[52] U.S. Cl. ..................................... 84/95.2; 235/86; 235/125; 434/197; 434/426
[58] Field of Search ...................... 84/94.1, 94.2, 95.1, 84/95.2; 235/1 B, 1 D, 86, 117 A, 125; 116/223, 306, 309; 434/197, 201, 426, 427

[56] References Cited

U.S. PATENT DOCUMENTS

| | | | |
|---|---|---|---|
| 1,136,673 | 4/1915 | Heron | 235/86 |
| 1,371,847 | 3/1921 | Brandvein | 235/86 |
| 1,821,184 | 9/1931 | Langos | 84/95.2 |
| 3,750,520 | 8/1973 | Inoue | 84/94.2 |

Primary Examiner—L. T. Hix
Assistant Examiner—Brian W. Brown
Attorney, Agent, or Firm—John C. Malloy

[57] ABSTRACT

In one embodiment, the musical box includes a box-like support structure and a music device disposed in the interior of the structure. A plurality of flexible continuous webs are sized to wrap around the outside of the structure. Each web has, along its outside surface, indicia representative of a particular mathematical data table, such as a multiplication table. One column of the table indicates the mathematical resultant of the remaining laterally displayed data. The resultant is disposed proximate a side of the support structure. A controllably movable strip or continuous web has a window and the window is sized to reveal one mathematical resultant. This continuous windowed web is driven by a gear and knob actuator.

8 Claims, 1 Drawing Sheet

U.S. Patent    May 17, 1988    4,744,282
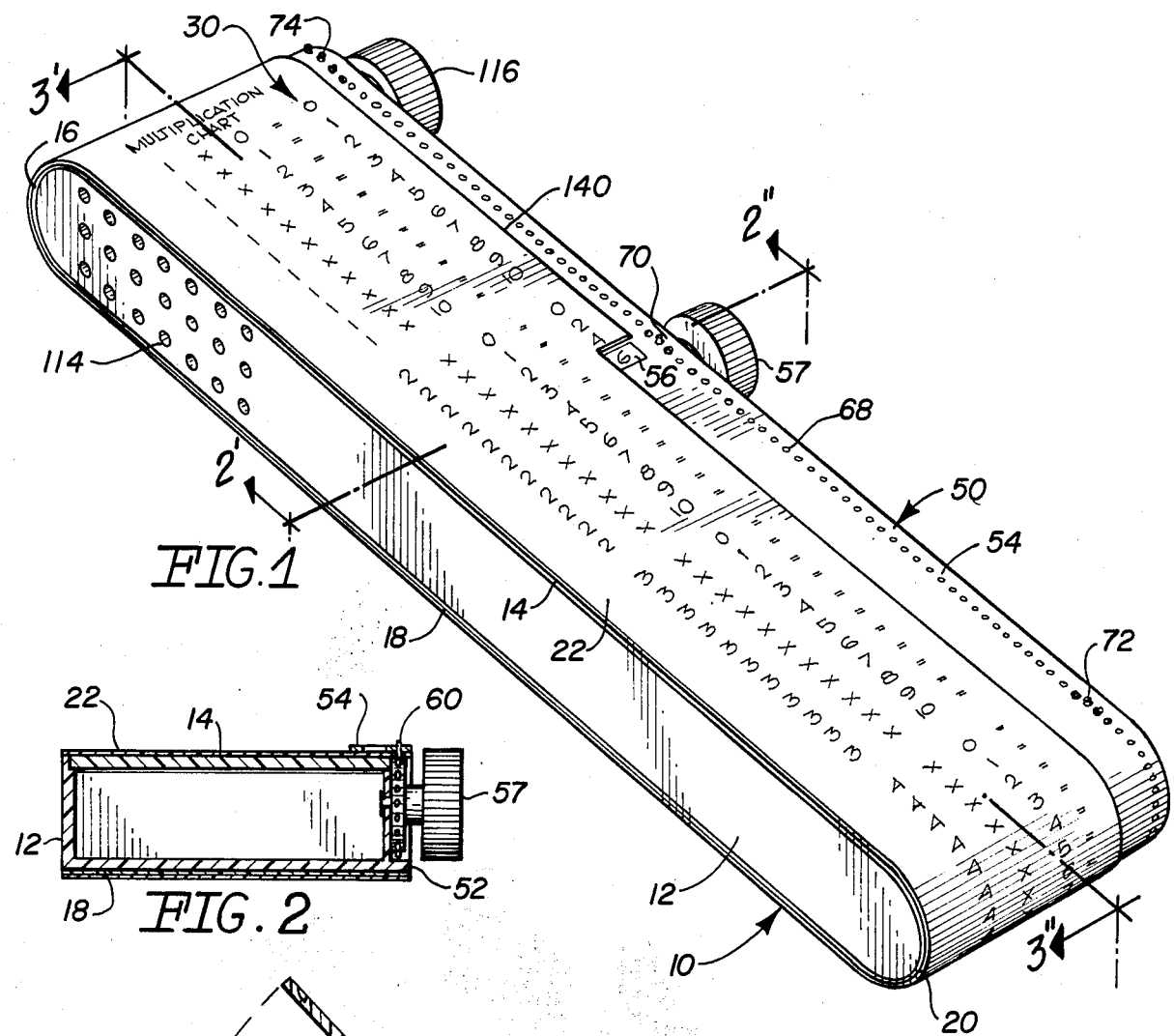
FIG. 1
FIG. 2
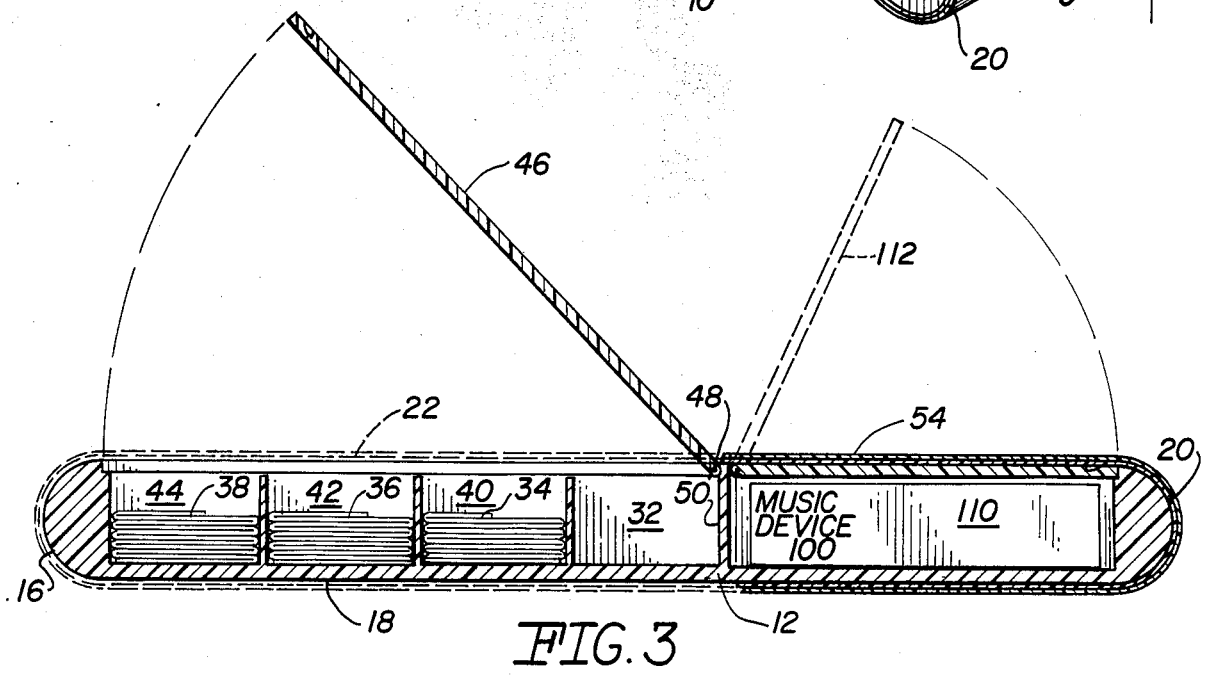
FIG. 3

MUSIC BOX WITH INSTRUCTIONAL DATA TABLES

BACKGROUND OF THE INVENTION

This invention relates to a musical box with instructional mathematical data tables.

It is known that children often will listen to music and play with the device that is producing the music. This invention capitalizes on this curiosity by combining a mathematical data table, such as multiplication, division, addition, and subtraction tables, with such a musical device.

Further, it is known that children enjoy playing with devices having knobs and movable parts. This invention further capitalizes on this curiosity by providing a structure with a turnable knob that moves a continuous web having a window therein which reveals the mathematical resultant on the mathematical tables.

OBJECTS OF THE INVENTION

It is an object of the present invention to provide a musical device which provides an instructional feature.

It is a further object of the present invention to provide a device which is compact.

It is an additional object of the present invention to provide a device which capitalizes on the curiosity of children via music and via movable knobs and at the same time teaches the children mathematics.

SUMMARY OF THE INVENTION

In one embodiment, the musical box includes a box-like support structure and a music device disposed in the interior of the structure. A plurality of flexible continuous webs are sized to wrap around the outside of the structure. Each web has, along its outside surface, indicia representative of a particular mathematical data table, such as a multiplication table. One column of the table indicates the mathematical resultant of the remaining laterally displayed data. The resultant is disposed proximate a side of the support structure. A controllably movable strip or continuous web has a window and the window is sized to reveal one mathematical resultant. This continuous windowed web is driven by a gear and knob actuator.

BRIEF DESCRIPTION OF THE DRAWINGS

Further objects and advantages of the present invention can be found in the detailed description of the preferred embodiment and taken in conjunction with the accompanying drawings in which:

FIG. 1 illustrates a perspective view of the musical box with an instructional table mounted on the outside of the box;

FIG. 2 is a cross-sectional view of the musical box from the perspective of section lines 2'—2" in FIG. 1; and, FIG. 3 is a cross-sectional view of the musical box with its cover open generally viewed from the perspective of section lines 3'—3" in FIG. 1.

DETAILED DESCRIPTION OF THE PREFERRED EMBODIMENT

The present invention relates to a musical box with removable instructional tables that function to teach children and others of mathematical relationships.

FIG. 1 illustrates a perspective of musical box 10. FIG. 2 illustrates a cross-sectional view of the musical box and FIG. 3 illustrates a longitudinal, cross-sectional view of the box. The same numerals designate similar items throughout all the figures. Musical box 10 includes box-like support structure 12. Wrapped around four outside faces 14, 16, 18, and 20 of the structure is a flexible, continuous web 22. In the illustrated embodiment, flexible web 22 is a multiplication chart depicting, in a lateral aspect, numbers to be multiplied and, in column 30, the mathematical resultant of the laterally displayed numbers. As used herein, the term "mathematical data tables" include multiplication, division, addition, and subtraction tables as well as other mathematical tables that are used to instruct children and other persons being taught the mathematical relationships. Flexible web 22 is one of a number of flexible webs that wrap around the exterior surface of support structure 12 along faces 14, 16, 18, and 20. Web 22 can be paper or plastic.

Web 22 is removable from support structure 12 and can be folded and placed in compartment 32 shown in FIG. 3. Other flexible webs 34, 36 and 38 are disposed in similar corresponding compartments 40, 42 and 44. Access is provided to these compartments via a hinged cover 46 that is hingedly mounted at 48 to separation wall 50 in the interior of support structure 12. Other types of covers could be utilized rather than a hinged cover. Particularly, a cover that slides laterally from the box to provide access to compartments 32, 40, 42, and 44 can be utilized.

A controllably movable strip means 50 is disposed proximate side 52 (see FIG. 2) of box 12. Strip means 50 includes a continuous web 54 having a window 56 sized to reveal one mathematical resultant. As illustrated in FIG. 1, the multiplication chart shows $2 \times 3 = 6$, the numeral "6" being the mathematical resultant of 2 multiplied 3. Window 56 only reveals the resultant for the data laterally displayed with respect to that resultant.

Continuous windowed web 54 is movably mounted on support structure 12. A knob 57 is coupled to a gear 58 (see FIG. 2) and the gear has teeth, one of which is tooth or prong 60 that protrudes beyond the plane of face 14 of box 12, and most importantly protrudes beyond the exterior plane of continuous windowed web 54. Windowed web 54 includes longitudinally aligned guide holes, one of which is hole 68. A portion of the teeth of gear 58 protrude through a portion of the guide holes as shown in region 70 in FIG. 1. This feature enables the web to be moved when knob 57 is rotated.

In order to insure that continuous windowed web 54 remains on support structure 12, the preferred embodiment includes at least two guide gears that are partially illustrated by gear teeth 72 and 74 protruding out of continuous windowed web 54 at either longitudinal end of support structure 12. Of course, additional guide gears may be utilized to maintain the lateral positioning of continuous windowed web 54 with respect to side 52 of support structure 12.

In order to pique the curiosity of a child, support structure includes a music device 100 disposed in compartment 110 shown in FIG. 3. Compartment 110 may be closed via secondary cover 112 that is similarly hinged to wall 50 as is cover 46. Speaker holes 114 in FIG. 1 allow the acoustical sounds to be emitted from the support structure. Knob 116 can function as an ON/OFF, tuning and volume control if music device 100 is a radio or could function as a wind-up knob if music device 100 is a wind-up musical device similar to those found in musical dolls.

If musical device 100 is a radio, that device must include a battery and secondary cover 112 would be necessary to change the battery in the device. Also, the device could be a small cassette player.

In operation, flexible web 22 is removed from faces 14, 16, 18, and 20 by laterally sliding web 22 from the outside of the box away from side 52 and knob 56. Cover 46 is opened, web 22 is folded and placed in the box, web 36 is removed from compartment 40, unfolded, and then laterally slid over faces 14, 16, 18, 20 until one edge of web 36 abuts edge 140 (FIG. 1) of windowed web 54. The person operating the musical box can turn on the music via control knob 116 and simultaneously learn the mathematical relationships embodied in the table by moving knob 56 such that window 56 is laterally aligned with the viewed data.

The claims appended hereto are meant to cover modifications and changes within the scope and spirit of the present invention.

What I claim is:

1. A musical box with instructional tables comprising: a box-like support structure; means for controllably producing music disposed in the interior of said support structure; a flexible, continuous web sized to wrap around said support structure and having indicia representative of mathematical data tables, one column thereof indicating the mathematical resultant of data laterally displayed with respect thereto, said mathematical resultants disposed proximate a side of said support structure; and, a controllably movable strip means disposed proximate said side of said support structure including a continuous web having a window therein sized to reveal one of said mathematical resultants.

2. A musical box as claimed in claim 1 including a plurality of flexible webs each showing different mathematical data tables with a columnar presentation of mathematical resultants, said flexible webs being removably disposed on said support structure.

3. A musical box as claimed in claim 2 wherein said support structure includes retaining compartments for said flexible webs.

4. A musical box as claimed in claim 3 wherein said support structure includes movable cover means for said compartments.

5. A musical box as claimed in claim 1 wherein said continuous windowed web includes a plurality of guide holes along an edge extensive region thereof and said controllably movable strip includes drive gear and actuator therefor rotatably mounted on said support structure, said drive gear having prongs protruding through a portion of said plurality guide of holes in said continuous windowed web.

6. A musical box as claimed in claim 5 including at least one guide gear means rotatably mounted on said support structure having prongs protruding through another portion of said plurality of guide holes in said continuous windowed web for guiding said continuous windowed web.

7. A musical box as claimed in claim 5 including a plurality of flexible webs each showing different mathematical data tables with a columnar presentation of mathematical resultants, said flexible webs being removably disposed on said support structure.

8. A musical box as claimed in claim 7 wherein said support structure includes retaining compartments for said flexible webs.

* * * * *